(12) United States Patent
Boegli et al.

(10) Patent No.: US 6,408,512 B1
(45) Date of Patent: Jun. 25, 2002

(54) METHOD OF CORRECTING DEFORMED TURBINE BLADES

(75) Inventors: Andreas Boegli, Wettingen; Markus Schmid, Baden; Wolfgang Mueller, Rieden, all of (CH)

(73) Assignee: Alstom (Switzerland) Ltd., Baden (CH)

( * ) Notice: Subject to any disclaimer, the term of this patent is extended or adjusted under 35 U.S.C. 154(b) by 0 days.

(21) Appl. No.: 09/573,871

(22) Filed: May 18, 2000

(30) Foreign Application Priority Data

Jun. 5, 1999 (DE) .......................... 199 25 781

(51) Int. Cl.$^7$ .............................. B23P 15/00
(52) U.S. Cl. .................. 29/889.1; 29/402.19; 72/56
(58) Field of Search .................. 29/889.1, 402.05, 29/402.19; 72/56

(56) References Cited

U.S. PATENT DOCUMENTS

| | | | |
|---|---|---|---|
| 3,857,265 A | 12/1974 | Howeler et al. | |
| 4,187,709 A | 2/1980 | Legate et al. | |
| 6,176,970 B1 * | 1/2001 | Staton et al. | 72/56 |
| 6,230,537 B1 * | 5/2001 | Easterbrook | 72/56 |

FOREIGN PATENT DOCUMENTS

| | | |
|---|---|---|
| DE | 1 878 412 | 4/1960 |
| DE | 1 133 691 | 7/1962 |
| DE | 1 136 971 | 9/1962 |
| DE | 1 955 916 | 4/1964 |
| DE | 1 527 914 | 3/1971 |
| DE | 25 23 187 | 3/1976 |

OTHER PUBLICATIONS

Genzsch, Erwin O., "Explosions–Verfahren zur Verformung", *Das Industrieblatt*, Stuttgart, Aug. 1959, pp. 383–385.

"Unterwasserentladungen zur Formgebung von Metallen", *Technica*, No. 19, Sep. 6, 1960, p. 1148.

Pearson, John, "Metal Working with Explosives", *Journal of Metals*, Sep. 1960, pp. 673–686.

Bremer, Claus, "Kompressor–und Turbinenschaufeln automatisch reparieren", *Werkstatt und Betrieb*, 129, 1996, 7–8, pp. 672–674.

* cited by examiner

*Primary Examiner*—Irene Cuda-Rosenbaum
(74) *Attorney, Agent, or Firm*—Burns, Doane, Swecker & Mathis, L.L.P.

(57) ABSTRACT

A method of correcting deformed turbine components (1) in an incompressible medium (4) is achieved via means of a pressure wave (6). The turbine component (1) is rigidly fixed to a matrix (3) containing a specified mold (2) and is put into the incompressible medium (4). The method may advantageously work at ambient temperature. It is quick, reproducible and cost-effective.

6 Claims, 1 Drawing Sheet

METHOD OF CORRECTING DEFORMED TURBINE BLADES

FIELD OF THE INVENTION

The invention deals with a method of correcting deformed turbine components made of a nickel- or cobalt-based casting alloy.

BACKGROUND OF THE INVENTION

Thermomechanical production methods which are suitable for forming metal parts are known. In such production methods, the metal part is heated to a certain temperature at which the material can be formed in a ductile and/or superplastic manner. Such methods are dependent on a certain temperature of the component to be formed, which involves a high technological outlay, since parts of the hydraulic tool also have to be kept at a corresponding temperature.

SUMMARY OF THE INVENTION

An object of the invention is to overcome these disadvantages. The invention provides a method of correcting deformed turbine components (turbine blades, heat-accumulation segments, combustion-chamber tiles, etc.) made of a nickel- or cobalt-based casting alloy.

According to one aspect of the invention, this is achieved in that the turbine component is rigidly fixed to a matrix which contains a specified mold, the turbine component is plunged with the matrix into an incompressible medium, and a pressure wave is introduced into the incompressible medium. This method may advantageously also work at ambient temperature. It is quick, reproducible and cost-effective.

BRIEF DESCRIPTION OF THE DRAWINGS

Preferred embodiments of the invention are illustrated in the accompanying drawings, in which.

DETAILED DESCRIPTION OF THE INVENTION

Figure 1:
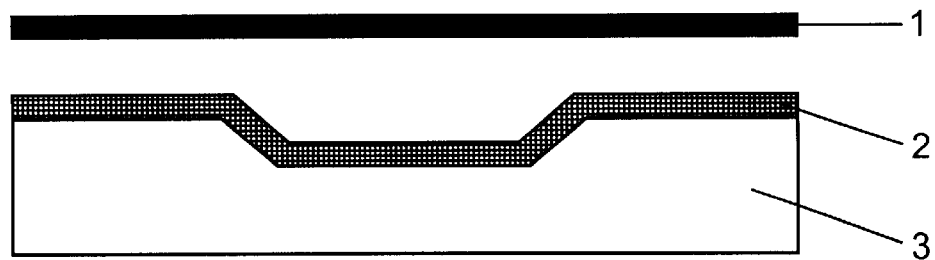
FIG. 1 is a schematic illustration of a deformed turbine component, and a specified mold and matrix according to one aspect of the present invention.

Only the elements essential for the invention are shown. The same elements are provided with the same reference numerals in different figures.

FIG. 1 shows a deformed turbine component 1 made of a nickel- or cobalt-based casting alloy. These components may be, for example, turbine blades, heat-accumulation segments or combustion-chamber tiles which are used in a power station. For example, the compositions are specified in Table 1.

Composition of an alloy taken by way of example (specifications in percentage by weight)

The method according to the invention for correcting this deformed turbine component 1 is to be used, for example, for components deformed in operation. It is also conceivable to use it in the case of new parts having a certain fabrication inaccuracy. A matrix 3 is used in order to form the deformed turbine component 1. Attached to the matrix 3 is a specified mold 2, which reproduces the subsequent shape of the component and also takes into account an elastic proportion during the forming.

Figure 2:
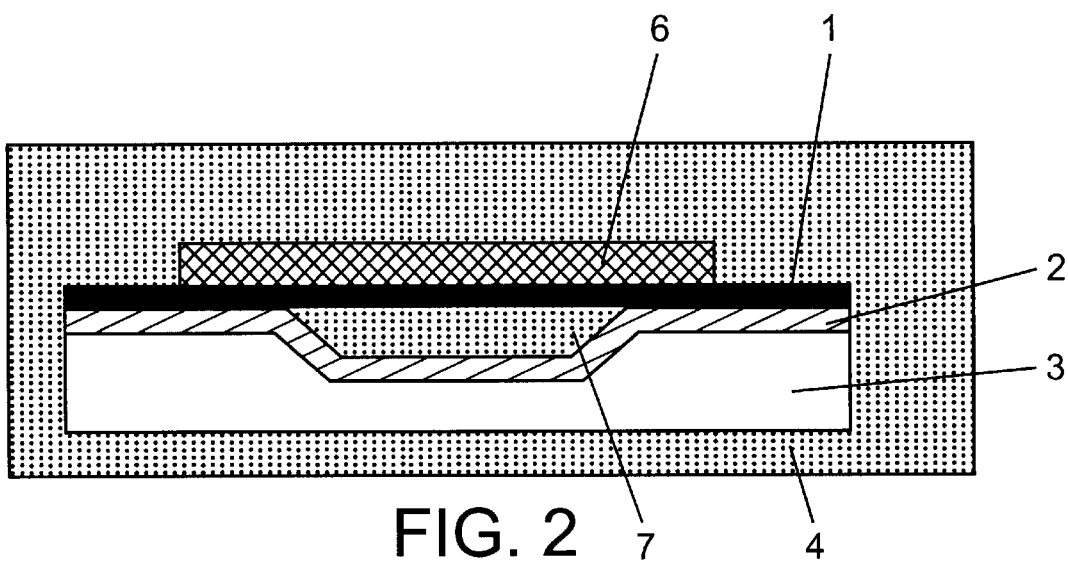
FIG. 2 which is a schematic illustration of an initial step of a method performed according to the principles of the present invention.

FIG. 2 reproduces the first step of the method according to the invention for correcting the deformed turbine component 1. The turbine component 1 is rigidly fixed to the matrix 3 having the specified mold 2. This specified mold 2 should have a thickness within a range of 1 to 30 mm. The matrix 3 should be made of a material having a modulus of elasticity of greater than 180 Gpa and a yield point $R_{0.2}$ of greater than 1500 MPa. A cavity 7 may be located between the turbine component 1 and the matrix 3/specified mold 2. The cavity 7 advantageously has a minimum height of 0.2 mm in those regions of the turbine component 1 which are to be formed. The turbine part 1 fixed to the matrix 3 is put into a medium 4. The medium 4 may be oil, water or another incompressible fluid which reacts in a stable manner under shock. It is conceivable for the cavity 7 to be sealed off from the medium 4 and for it to be capable of being evacuated, but the requisite connections are not shown in FIG. 2. In a further embodiment, the cavity 7 is sealed off from the medium 4 and evacuated or filled with a compressible gas.

It is also possible for the cavity 7 to be filled with the medium 4 and for the medium 4 to be able to escape through suitable openings (not shown in FIG. 2) in the matrix 3 during the pressure wave of the method according to the invention. The medium 4 should be incompressible in order to obtain adequate forming of the turbine component 1. The pressure wave 6, which is then introduced into the medium 4, is indicated schematically. The pressure wave must at least have a propagation velocity of greater than 2500 m/s in order to obtain an adequate forming effect on the turbine component 1. The pressure wave may be produced, for example, by an explosive (TNT in the form of foil, cord, etc.). It is also conceivable for the pressure wave to be applied directly to the surface of the turbine component 1.

Figure 3:
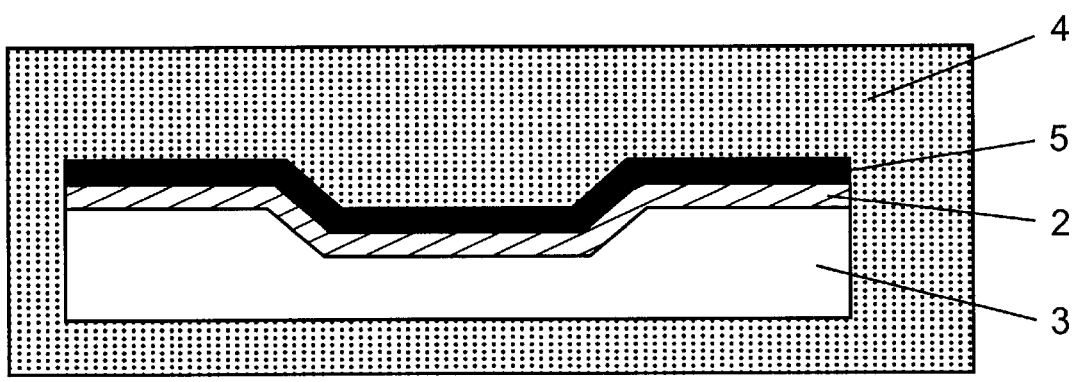
FIG. 3 is a schematic illustration of a further step of a method carried out consistent with the principles of the present invention.

FIG. 3 shows the turbine component 5 formed to specification in the specified mold 2 of the matrix 3 after the pressure wave 6 has been applied. Care is to be taken when designing the specified mold 2 to ensure that elastic over-stretching occurs, which after the forming can be shed again by the formed turbine component 5.

Depending on the medium 4 used, the method according to the invention for correcting deformed turbine parts 1 can advantageously work between a temperature of 5° C. and 200° C. of the medium 4. The tests carried out produced turbine blades 1 without any demonstrable damage to the base material. The process is quick, reproducible and also cost-effective.

TABLE 1

| Designation | C | Ni | Cr | Co | Mo | W | Al | Ti | Mb | Tm | V | B | Zr |
|---|---|---|---|---|---|---|---|---|---|---|---|---|---|
| IM 939 | 0.15 | 49 | 23 | 19 | — | 2 | 2 | 1.5 | 1 | 1.5 | — | 0.009–0.014 | 0.03–0.1 |
| IM 738 | 0.17 | 60 | 16 | 9 | 2 | 3 | 3.5 | 3.5 | 1 | — | 2 | 0.009–0.014 | 0.03–0.1 |

While the present invention has been described by reference to the above-described embodiments, certain modifications and variations will be evident to those of ordinary skill in the art. Therefore, the present invention is to be limited only by the scope and spirit of the appended claims.

What is claimed is:

1. A method of correcting deformed turbine components made of an Ni- or Co-based casting alloy, the method comprising:

rigidly fixing the deformed turbine component to a matrix which contains a specified mold;

plunging the deformed turbine component with the matrix into an incompressible medium; and introducing a pressure wave into the incompressible medium or producing a pressure wave directly on a surface, to be formed, of the turbine component.

2. The method as claimed in claim 1, wherein the method is carried out with a cavity between the turbine component and the matrix/specified mold, the cavity having a size of at least 0.2 mm.

3. The method as claimed in claim 2, further comprising closing off the cavity from the incompressible medium and evacuating the cavity before the pressure wave is applied.

4. The method as claimed in claim 2, further comprising closing off the cavity from the incompressible medium and filling the cavity with a compressible gas before the pressure wave is applied.

5. The method as claimed in claim 1, wherein the pressure wave has a propagation velocity of $\leq 2500$ m/s.

6. The method as claimed in claim 1, wherein the incompressible medium is at a temperature of between 5° C. and 200° C.

* * * * *